(12) United States Patent
Bruce et al.

(10) Patent No.: US 6,485,821 B1
(45) Date of Patent: Nov. 26, 2002

(54) GYPSUM-BASED CONSTRUCTION MATERIAL

(75) Inventors: Robert B. Bruce, Burlington (CA); David M. Harriss, Chesterfield, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/512,921

(22) Filed: Feb. 25, 2000

Related U.S. Application Data

(60) Provisional application No. 60/121,698, filed on Feb. 25, 1999.

(51) Int. Cl.[7] .................................................. B32B 3/24
(52) U.S. Cl. ...................... 428/304.4; 428/70; 428/71; 428/156; 428/170; 428/171; 428/172
(58) Field of Search .............................. 428/156, 170, 428/171, 172, 70, 71, 304.4, 312.4, 318.4, 703; 442/386

(56) References Cited

U.S. PATENT DOCUMENTS

| | | | |
|---|---|---|---|
| 1,943,663 A | 1/1934 | Ericson | 154/2 |
| 3,427,376 A | 2/1969 | Dempsey | 264/282 |
| 3,694,298 A | 9/1972 | Veschuroff et al. | 161/43 |
| 4,327,146 A | 4/1982 | White | 428/308.8 |
| 4,351,867 A * | 9/1982 | Mulvey et al. | 428/70 |
| 4,476,175 A * | 10/1984 | Forry et al. | 428/170 |
| 5,319,900 A | 6/1994 | Lehnert et al. | 52/408 |
| 5,688,468 A | 11/1997 | Lu | 264/555 |
| 5,704,179 A | 1/1998 | Lehnert et al. | 52/408 |
| 5,879,486 A | 3/1999 | Philips et al. | 156/39 |

FOREIGN PATENT DOCUMENTS

| | | | |
|---|---|---|---|
| CA | 1 189 434 | 6/1985 | ........... B32B/31/12 |
| JP | 49-112920 | 10/1974 | |
| JP | 53-73216 | 6/1978 | ............ B28B/1/16 |
| JP | 53-115516 | 10/1978 | ............ E04B/1/86 |
| JP | S54-24421 | 2/1979 | |
| JP | 4-14575 | 4/1992 | ............ E04C/2/04 |
| JP | 8-300550 | 11/1996 | ........... B32B/13/14 |
| JP | 10-235822 | 9/1998 | |

* cited by examiner

*Primary Examiner*—Harold Pyon
*Assistant Examiner*—Alicia Chevalier

(57) ABSTRACT

The present invention relates to a process for manufacturing a gypsum-based substrate. The process includes the steps mixing gypsum and water to produce a gypsum slurry, providing a synthetic polymeric fibrous sheet on one side of a layer of the gypsum slurry, and adhering to the wet gypsum to the sheet with an adhesive strength of at least 7.5 lb. The present invention is also directed to a gypsum board comprised of first and second polymeric fibrous sheets adhered to opposite sides of a wet gypsum core, wherein the first surface of the first sheet and the first surface of the second sheet have pores containing set gypsum and the first and second sheets adhere to said wet gypsum core with an adhesive strength of at least 7.5 lb.

18 Claims, 2 Drawing Sheets

000
GYPSUM-BASED CONSTRUCTION MATERIAL

This application claims benefit of priority from Provisional Application No. 60/121,698 filed on Feb. 25, 1999.

BACKGROUND OF THE INVENTION

1. Field of the Invention

This invention relates to gypsum-based construction materials. More particularly, the invention relates to a gypsum-based substrate faced with a synthetic polymeric sheet material that is suited for use as a construction material such as wallboard or ceiling panels. The invention is also directed to a process for manufacturing a gypsum-based substrate faced with a synthetic polymeric sheet material.

2. Description of Related Art

Gypsum wallboard is traditionally manufactured by a continuous process. In the process, a gypsum slurry is first generated in a mechanical mixer by mixing calcium sulphate hemihydrate (also known as calcined gypsum), water, and other agents. The gypsum slurry is deposited on a paper sheet. An upper continuously advancing paper sheet is laid over the gypsum and the edges of the upper and lower sheets are pasted to each other. The paper sheets and gypsum slurry are passed between parallel upper and lower forming plates or rolls in order to generate an integrated and continuous flat strip of unset gypsum sandwiched between the paper sheets that are known as facing or liners. This strip is conveyed over a series of continuous moving belts and rollers for a period of 2 to 5 minutes during which time the core begins to hydrate back to gypsum and hardens. During each transfer between belts and/or rolls, the strip is stressed in a way that can cause the paper facing to delaminate from the gypsum core if the adhesion between the gypsum core and the facing is not sufficient. Once the gypsum core has set sufficiently, the continuous strip is cut into shorter lengths or even individual boards or panels of prescribed length. Once again, it is important for there to be good adhesion between the paper sheets and the set, but still wet, gypsum core or the cutting action will pull the edges of the paper facing sheet away from the gypsum core.

After the cutting step, the gypsum boards are separated and grouped through a series of belts and rollers and then flipped over before being fed into drying ovens or kilns where the boards are dried so as to evaporate excess water. The hydration from hemihydrate to gypsum must be essentially complete by this point, normally between 7 and 15 minutes after mixing. When the gypsum boards are accelerated, flipped and fed into the drying ovens, the boards are subjected to a variety of stresses that can cause the facing to peel away from the gypsum core of the boards unless there is good adhesion between the set (but still wet) gypsum core and the facing material. Inside the drying ovens, the boards are blown with hot drying air at speeds up to 4000 feet/minute which can cause further delamination of the paper facing if there is not good wet adhesion between the gypsum and the paper liners. When portions of the facing sheets delaminate from the gypsum core during drying in the oven, the liner becomes entangled in the rollers and the gypsum crumbles as it dries, jamming the oven, which requires frequent shut downs of the line while the loose gypsum is cleaned out of the ovens. The gypsum boards are dried in the ovens for anywhere from 30 to 75 minutes. After the dried gypsum boards are removed from the ovens, the ends of the boards are trimmed off and the boards are cut to desired sizes.

The fully dried gypsum adheres well to the paper facing sheet materials as long as the gypsum board is kept dry. However, paper facing has a number of inherent properties that can be detrimental in a gypsum wallboard product. Paper facing material (sometimes called a paper liner) is not as strong or abrasion resistant as needed for certain construction applications. In addition, because the strength of paper differs significantly depending on the direction in which the strength is measured, paper facing must be relatively thick in order to achieve satisfactory multidirectional strength. Paper faced gypsum-board products also suffer from a lack of abrasion resistance. Paper facing used on conventional gypsum board becomes especially weak and subject to delamination from the gypsum core when the paper becomes damp due to leaks or high humidity. Paper-faced gypsum boards must generally be coated with another material, such as paint or wallcoverings, in order to achieve sufficient abrasion resistance. To overcome these durability problems, paperfaced wallboard is frequently covered with a hard sheet or plastic film when used in high traffic areas.

There have been attempts to substitute stronger and more durable synthetic sheet materials for the paper liners found in conventional gypsum board products. Plastic films do not work as liners because they are not permeable to moisture which makes it difficult to remove excess water from the gypsum. Canadian Patent No. 1,189,434 discloses gypsum panels made with a facing of a moisture vapor permeable spunbonded nonwoven material. Canadian Patent No. 1,189,434 discloses gypsum panels faced with Tyvek® spunbonded olefin sheet material. Tyvek® is a registered trademark of E.I. du Pont de Nemours and Company of Wilmington, Del. Tyvek® sheets are made by solution flash-spinning polyethylene to form fine plexifilamentary fibril structures that can be thermally bonded to form sheet material. U.S. Pat. No. 5,704,179 also mentions that nonwoven mats of synthetic resin fibers can be used to face gypsum panels.

Although it has been possible to produce gypsum boards faced with synthetic fibrous sheet materials on a small laboratory scale, it has not been feasible to produce gypsum boards faced with such synthetic fibrous sheets on a commercial scale. This is because the adhesive strength between conventional fibrous synthetic sheets and the wet gypsum core (known as wet adhesion) is low. Thus, the facing peels away from the gypsum core during various points in the production process before the boards are fully dried in the drying ovens. There is a need for a process by which gypsum board faced with a synthetic fibrous sheet can be made without having portions of the facing peel away from the gypsum core. There is also a need for a gypsum board faced with a synthetic sheet that is structured such that it can be produced on a commercial scale without portions of the facing becoming delaminated from the gypsum core.

BRIEF SUMMARY OF THE INVENTION

The present invention is directed to a process for manufacturing a gypsum-based substrate. The process comprises the steps of: adding calcined gypsum and water to a mixer; mixing the gypsum and water in the mixer to produce a gypsum slurry that is comprised of 50 to 65 weight percent gypsum, and is comprised of 35 to 50 weight percent of water, based on the total weight of the of the gypsum slurry, said gypsum slurry having a density in the range of 0.95 to 1.5 g/cm³; providing a first synthetic polymeric fibrous sheet, the first sheet having a first surface; pouring the gypsum slurry from said mixer onto the first surface of said first sheet and spreading the gypsum slurry over said first surface of said first sheet; providing a second fibrous sheet, the second sheet having a first surface; placing the first surface of the second sheets over the gypsum slurry that has been spread over the first surface of the first sheet; enclosing the gypsum slurry between the first and second sheets to bring the slurry into intimate contact with the first and second sheets and form an elongated strip of gypsum slurry sandwiched between the first and second sheets; allowing the elongated strip of gypsum slurry to set up and harden to form a stiff elongated strip having a solid, wet gypsum core sandwiched between the first and second sheets, the the first and second sheets adhering to the wet gypsum core with an adhesive strength of at least 7.5 lb; cutting the stiff elongated strip into gypsum board of desired length; and drying the gypsum board in a dryer to remove excess water from the gypsum boards.

Preferably, the in the step of allowing the elongated strip of gypsum slurry to set up and harden to form a stiff elongated strip having a solid, wet gypsum core sandwiched between the first and second sheets, the first and second sheets adhere to said wet gypsum core with an adhesive strength of at least 10 lb. In the most preferred process of the invention, during the step of enclosing the gypsum slurry between the first and second sheets, the first and second sheets move at a linear speed of at least 50 ft/min.

According to the preferred process of the invention, the second sheet is a synthetic polymeric fibrous sheet. The first surface of the first sheet and the first surface of the second sheet have open pores between fibers of sufficient size for the gypsum slurry to enter the pores and become intertwined with the fibers in the sheets when the gypsum slurry is enclosed between the first and second sheets. Preferably, the first and second sheets each have a mean flow pore size, measured according to ASTM F316-86, of at least 8 microns, and more preferably in the range of 8.7 to 40 microns.

According to the more preferred process of the invention, the first and second sheets are nonwoven sheets. Preferably, the first surface of the first sheet and the first surface of the second sheet are made of sheets selected from the group of needle punched staple fiber sheets, hydroentangled fibrous sheets, and spunbond sheets.

Alternatively, the first surface of the first sheet and the first surface of the second surface of the second sheet may be embossed surfaces. According to another alternative embodiment of the invention, the first surface of the first sheet and the first surface of the second sheet are precoated with a layer of a high density gypsum slurry having a density that is at least 1.1 times the density of the gypsum slurry.

The present invention is also directed to a gypsum board, comprising: a first polymeric fibrous sheet having a first surface; a second polymeric fibrous sheet having a first surface; a wet and stiff gypsum core sandwiched between the first and second sheets; wherein the first surface of the first sheet and the first surface of the second sheet have pores containing set gypsum of said gypsum core intertwined with the fibers in the first and second sheets, the first and second sheets adhering to said wet gypsum core with an adhesive strength of at least 7.5 lb. Preferably, the first and second sheets adhere to the wet gypsum core with an adhesive strength of at least 10 lb. It is further preferred that the first and seconds sheets be nonwoven sheets. The first surface of said first sheet and the first surface of the second sheet may be comprised of a web selected from the group of needle punched staple fiber sheets, hydroentangled fibrous sheets, and spunbond sheets. The first surface of the first sheet and the second surface of the second sheet may be embossed surfaces. According to another embodiment of the invention, the first surface of the first nonwoven sheet and the first surface of the second nonwoven sheet are coated with a primer layer of a high density gypsum slurry having a density that is at least 1.1 times the density of the gypsum core.

BRIEF DESCRIPTION OF THE DRAWING(S)

The accompanying drawings, which are incorporated in and constitute a part of this specification, illustrate the presently preferred embodiments of the invention and, together with the description, serve to explain the principles of the invention.

TEST METHODS

Figure 1:
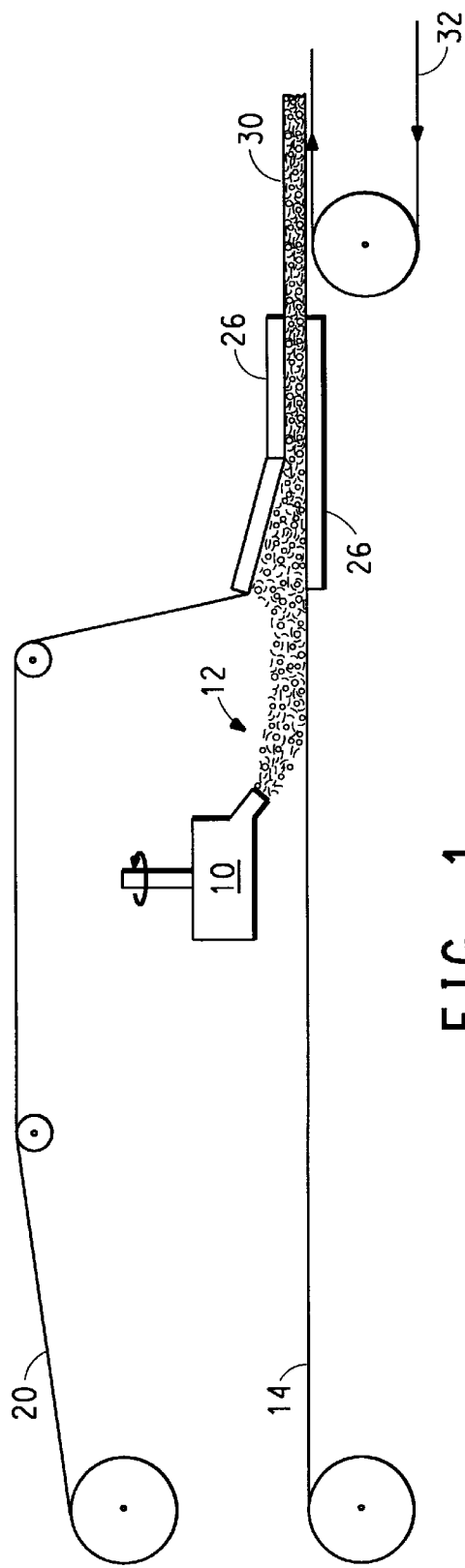
FIG. 1 is a schematic representation of a portion of the process of the invention.

In the description above and in the non-limiting examples that follow, the following test methods were employed to determine various reported characteristics and properties. ASTM refers to the American Society for Testing and Materials.

Wet Adhesion was measured using an Instron tensile tester according to the following procedure.

Gypsum boards were prepared using a mold comprising a laminated board having three aluminum rails of ½ inch height (12.7 mm) screwed thereto to define three sides of a rectangular mold with one open end. The aluminum rails were sized to form a mold having a length of about 20 inches (50.8 cm) and a width of 3.75 inches (9.53 cm). With one of the longer side rails removed, a nonwoven sheet having a length of 19 inches (48.3 cm) and a width of 5.5 inches (14.0 cm) was placed on the bottom of the mold to act as a liner on the first side of the gypsum board. After re-screwing the 20 inch (50.8 cm) rail to the bottom of the mold, 1.75 inches (4.44 cm) of the 5.5 inch (14.0 cm) liner width extended outside of the mold, underneath the aluminum rail. The portion of the liner extending outside the mold forms an overhanging portion of the liner on the final gypsum board, which is inserted into the clamp of the Instron testing machine during wet adhesion testing. Immediately after mixing, as described in the examples below, a gypsum slurry was poured into the mold onto the nonwoven liner and spread evenly over the surface thereof. A second piece of nonwoven sheet material having dimensions of about 20 inches (50.8 cm) by 3.75 inches (9.53 cm) was placed on top of the gypsum slurry to act as a liner on the second side of the gypsum board. The board was allowed to sit at room temperature for 20 minutes to allow the gypsum to set. The temperature of representative mixes were monitored to ensure that the hydration was complete within this time frame (the temperature of the mix rises during hydration, then holds steady, and finally drops once hydration was complete). Hydration times of 16 to 18 minutes were recorded for the boards produced in the examples below. The boards were removed by unscrewing and removing the side rail which was on top of the overhanging section of liner and sliding each board out of the mold. The boards were flipped over so that the first side having the overhanging liner was on the top surface.

Immediately after the gypsum had set, each board was cut, using a utility knife, into three, four or five 3 inch (7.6 cm) by 3.75 inch (9.53 cm) sections (with the top liner having dimensions of 3 inches (7.6 cm) by 5.5 inches (14 cm) due to the overhang). The top nonwoven liner on each board section was cut parallel to the 3.75 inch (9.53 cm) side into three 1 inch (2.54 cm) wide strips and each strip was cut in the perpendicular direction such that the length of the liner section to be pulled off the board was 2 inches (5.1 cm) (in addition to the 1.75 inch (4.45 cm) overhang). The time taken to cut the board and the liner strips was no more than about 10 minutes.

The board was clamped in the Instron machine and the center strip was pulled from each board section with the Instron set at 20 or 50 pounds force (89 or 222 Newtons). During testing, the liner strip was pulled from the board in the direction parallel to the length of the liner. The wet adhesion was measured as the force in pounds at which the 2 inch length of liner was completely pulled away from the board. Testing of all of the three to five samples was completed within 5 minutes of testing the first sample. The wet adhesion is reported as the average (+/− standard deviation) of the three to five samples tested for each board.

Maximum, minimum, and mean flow pore sizes were measured for the nonwoven liners on a Coulter Porometer II according to ASTM F316-86 using Porofil wetting fluid, available from Coulter. The max pore size is an indicator of the diameter of the largest pore channels in the distribution of pore sizes supporting flow through the web. The mean flow pore size is an indicator of the mean pore channel diameter for the pores supporting the total flow. The minimum pore size is an indicator of the minimum pore channel diameter for the pores supporting the total flow through the web. Pore size calculations were made using a size factor of 0.64, a tortuosity factor of 1.00, and a sample thickness of 10 microns.

Basis weight was determined by ASTM D-3776, which is hereby incorporated by reference, and is reported in g/m2.

DETAILED DESCRIPTION OF THE INVENTION

Figure 2:
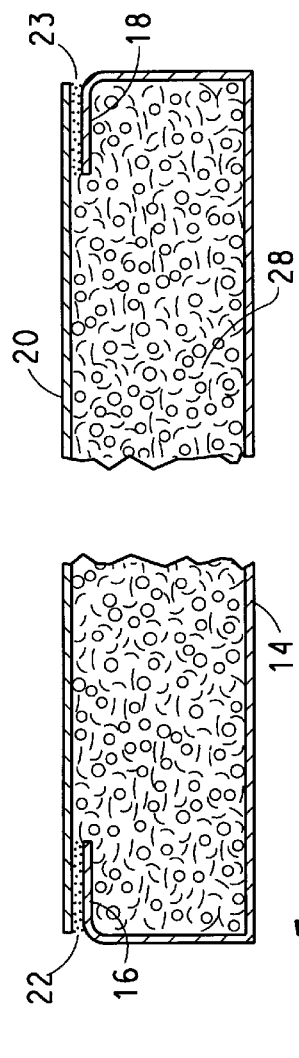
FIG. 2 is a cross-sectional view of a gypsum-based substrate made according to the invention.
Figure 3:
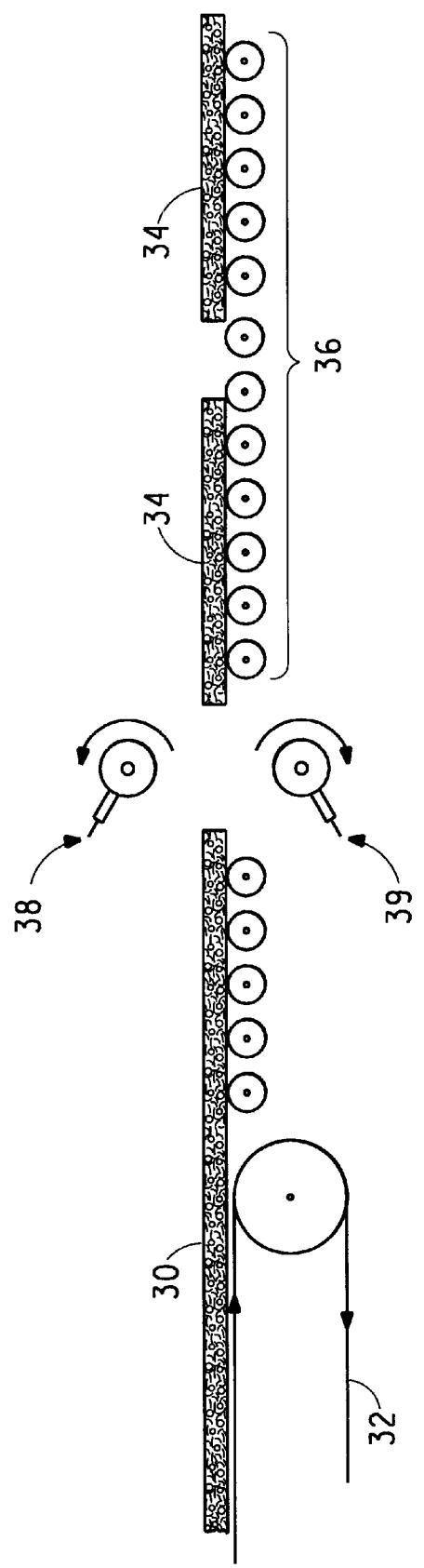
FIG. 3 is a schematic representation of another portion of the process shown in FIG. 1.

Reference will now be made in detail to the presently preferred embodiments of the invention, examples of which are illustrated below. The present invention is directed to an improved process for manufacturing gypsum boards having a gypsum core lined with a synthetic fibrous facing material. As discussed in the background section above, gypsum wallboard is traditionally manufactured by a continuous process. According to the embodiment of the process of the invention that is shown in FIG. 1, a gypsum slurry is first generated in a mechanical mixer 10 by mixing calcium sulphate hemihydrate (also known as calcined gypsum), water, water reducing agents, foam, bonding agents, and set control agents. The foam is a mixture of water, a foaming agent such as alkyl sulfate/alkyl ether sulfate mixtures, and air. Other additives, such as anti-burning agents, can be added to the slurry as needed. The gypsum slurry 12 is deposited on the central portion of a continuously advancing first polymeric fibrous sheet 14. The edges of the first nonwoven sheet 14 are folded upward. As can be seen in the cross-sectional view of FIG. 2, each of the ends of the upturned edges of the sheet 14 are folded toward each other along folds located a short distance, depending on the thickness of the board, from each of the first folds so as to form strips 16 and 18 that are substantially parallel to the bottom of the sheet. An upper continuously advancing second polymeric fibrous nonwoven sheet 20, with a starch paste or other adhesive applied on opposite edges of its bottom surface as adhesive strips 22 and 23, is laid over the gypsum slurry such that the edge paste strips 22 and 23 contact the folded over strips 16 and 18 of the first sheet 14. The polymeric fibrous sheets 14 and 20 may be woven or nonwoven synthetic sheets. Nonwoven sheets made of fiber forming thermoplastic polymers are preferred. For certain end uses, such as in decorative wall panels, it may be desirable, for economic reasons, to use a synthetic nonwoven sheet to line one side of the gypsum board and a conventional paper liner on the other side of the board. Use of a paper liner in combination with a synthetic nonwoven liner may also facilitate the processing of the board in the gypsum board manufacturing process due to the excellent adhesion which paper liners provide. Such a board provides the advantages of having a durable, abrasion resistant surface characteristic of the synthetic nonwoven liner, at reduced cost.

As can be seen in FIG. 1, the first and second nonwoven sheets and gypsum slurry are passed between parallel upper and lower forming plates 26 or rolls in order to generate an integrated and continuous flat strip 30 of unset gypsum sandwiched between the synthetic fibrous sheets, which are referred to as synthetic facing or liners. The strip 30 is conveyed over a series of continuous moving belts 32 and rollers (not shown) for a period of 2 to 5 minutes during which time the gypsum core 28 sets up. It is important that a good bond be formed quickly between the wet gypsum and the sheets 14 and 20 because the strip 30 can move at speeds in excess of 500 ft/min over a distances of 1200–2000 feet, during which time the strip 30 is transferred between multiple belts and rollers. During each transfer between belts and/or rolls, the strip 30 is stressed in a way that can cause the synthetic facing to delaminate from the gypsum core 28 if the adhesion between the gypsum core and the facing is not sufficient. Once the gypsum has set, the continuous strip 30 is cut into shorter lengths or individual boards or panels 34 of prescribed length by means of the rotating serrated blades 38 and 39. Once again, it is important for there to be good adhesion between the fibrous synthetic sheets 14 and 16 and the set, but still wet, gypsum core 28. Otherwise the blades 38 and 39 pull the edges of the synthetic facing sheet 14 and 16 away from the gypsum core 28 as the blades rotate during the cutting process.

After the cutting step, the gypsum boards 34 are accelerated on rollers 36 to separate the boards from each other. The separated gypsum boards are then lifted from the line and flipped over by my means of a plurality of lifting arms. The boards are fed, with their top sides down, into drying ovens or kilns where the boards are dried so as to evaporate excess water. When the gypsum boards are accelerated, flipped and fed into the drying ovens, the boards are subjected to a variety of stresses that would cause the synthetic facing to peel away from the gypsum core of the boards but for the excellent wet adhesion between the set (but still wet) gypsum core and the facing material that is obtained by means of the process of the invention. Inside the drying ovens, the boards are blown with hot drying air at speeds up to 4000 feet/minute. The absence of loose edges where there is not good adhesion between the nonwoven synthetic sheets 14 and 16 and the wet gypsum core 28 means that the facing is not pulled away from the gypsum core by the hot drying air. The gypsum boards are dried in the ovens for anywhere from 30 to 75 minutes. After the dried gypsum boards are removed from the ovens, the ends of the boards are trimmed off and the boards are cut to desired sizes.

According to one preferred embodiment of the invention, the first and second synthetic sheets each have a first surface characterized by pores or spaces formed between fibers, which pores are of sufficient size for a gypsum slurry to enter the pores and become intertwined with the fibers in the sheets so as to form a strong mechanical bond between the gypsum core and the synthetic fibrous sheets when the gypsum sets up. The gypsum slurry is deposited on this first porous surface of the first sheet and the first porous surface of the second sheet is juxtaposed against the gypsum such that when the gypsum slurry is enclosed between said first and second fibrous sheets, the slurry impregnates into the pores or spaces between the fibers on the surfaces of the first and second sheets. According to a preferred embodiment of the invention, the first and second nonwoven sheets each have a mean flow pore size, measured according to ASTM F316-86, of at least 8 microns. According to a more preferred embodiment of the invention, the first and second nonwoven sheets each have a mean flow pore size, measured according to ASTM F316-86, in the range of 8.7 to 40 microns. This range of pore sizes allows the wet, set gypsum layer to intertwine with the fibers of the synthetic fibrous liner, providing good wet adhesion, without the gypsum slurry penetrating completely through the nonwoven liner.

In the process of the invention the first and second sheets may be nonwoven sheets comprised of meltspun substantially continuous fibers, carded staple fiber webs, needle punched staple fiber webs, hydroentangled fibrous webs, or other porous nonwoven synthetic structures. The fibers in the first and second nonwoven sheets are comprised of synthetic melt spinnable polymer. The preferred fibers are comprised of one or more of any of a variety of polymers or copolymers including polyethylene, polypropylene, polyester, arimids, nylon, elastomer, and other melt spinnable polymers. For example, the fibers of the first and second nonwoven sheets may be comprised of at least 50% by weight polyester polymer, such as poly(ethylene terephthalate), poly(propylene terephthalate), or poly(butylene terephthalate) polymer. Alternatively, the fibers may be comprised of at least 50% by weight of a nylon polymer, a polyolefin polymer such as polyethylene or polypropylene, or an elastomeric polymer such as polyurethane or co-polyether ester.

According to one preferred embodiment of the invention, the first and second nonwoven sheets may be comprised of small denier polymeric fibers that, when made into a sheet structure, form numerous very small pores. The fibers of such sheet can be melt spun and air drawn according to the process disclosed in U.S. Pat. No. 5,688,468. Such nonwoven sheet may be a unitary fibrous sheet comprised of melt spun substantially continuous filament polymer fibers wherein the sheet has a basis weight of from 13 g/m$^2$ to 125 g/m$^2$ and substantially all of the fibers are melt spun fibers. The fibers in such nonwoven sheets have a cross sectional area of between about 20 and about 90 $\mu m^2$, and more preferably, of from about 25 to about 70 $\mu m^2$, and most preferably from about 33 to about 60 $\mu m^2$. Such melt spun microfibers sheets have a tensile strength (in both the machine and cross directions), normalized for basis weight, of from 0.7 to 5 N/(g/m$^2$), and more preferably from 0.8 to 4 N/(g/m$^2$), and most preferably from 0.9 to 3 N/(g/m$^2$).

According to another preferred embodiment of the invention, the surface of the synthetic liner which contacts the gypsum slurry can be made with a textured surface comprising depressions and/or protrusions. Such textured surfaces can be found in embossed nonwoven fabrics (e.g. thermally point-bonded nonwoven fabrics) or in woven fabrics. The gypsum slurry flows into the depressions or around the protrusions on the textured surface and mechanically locks the gypsum layer to the liner as the gypsum layer expands during setting. Preferably the depressions or protrusions have dimensions in the range of about 50 to 2000 microns in the plane of the liner and from about 30 to 500 microns in depth with between 20 and 100 depressions/protrusions per square centimeter. More preferably, the dimension of the protrusions in the plane of the liner is between about 100 and 1000 microns, the depth of the protrusions is between about 200 and 500 microns, and there are between 30 and 75 depressions/protrusions per square centimeter. The dimensions of the protrusions/depressions can be measured by microscopic analysis using scanning electron microscopy techniques known in the art.

According to another preferred embodiment of the invention, the process of the invention may include the steps of coating the first surface of each of the first and second fibrous synthetic sheets with a thin coating of a dense gypsum slurry. Preferably, the first surface of said first sheet and said first surface of said second sheet are coated with a layer of a high density gypsum slurry having a density that is 1.1 to 3 times the density of the gypsum slurry used to form. the core of the gypsum board. Preferably, the dense gypsum layer has a thickness in the range of 1/32 to 1/8 inch and has a dry density of between about 0.70 and 1.72 g/cc (corresponding to a wet density of between about 1.06 to about 1.98 g/cc). The gypsum slurry density may be calculated based on a density of water of 1 g/cc and a gypsum density of 2.32 g/cc or can be measured using methods known in the art. Typical commercial gypsum board core densities are approximately 0.96 g/cc (wet) and 0.63 g/cc (dry). Gypsum boards lined with a synthetic polymeric nonwoven liner having a high density layer adjacent the liner can be produced using methods known in the art for paper liners. For example, the high density gypsum slurry may be coated onto the nonwoven liner using the roller-coating apparatus and method described in U.S. Pat. No. 5,879,486, which is hereby incorporated herein by reference. Alternately, a defoaming agent can be applied to the surface of the synthetic polymeric nonwoven liner which results in an increase in the gypsum density immediately adjacent the liner, as described in White, U.S. Pat. 4,327,146, incorporated herein by reference. In paper-faced gypsum boards, the paper has good wet adhesion to the gypsum slurry and the high density gypsum layer is used to improve the dry bond between the paper liner and the gypsum. In the current invention, the use of a high density gypsum layer results in improved wet adhesion between the nonwoven liner and the gypsum slurry, allowing the board to be manufactured using conventional gypsum board manufacturing processes.

EXAMPLES

The following non-limiting examples are intended to illustrate the product and process of the invention and not to limit the invention in any manner.

Gypsum Slurry Preparation

In each of the following examples, the gypsum slurry was prepared by the following procedure. The gypsum slurry used in the following examples was prepared by pre-blending (by shaking in a plastic bag) 400 grams of General Purpose White Molding Plaster (available from USG Corporation), a beta-type hemihydrate plaster similar to that used in a commercial gypsum board factory, and 0.67 grams of a very finely ground gypsum accelerator having an average particle size of less than 2 microns. The pre-blended powder was then sifted over a period of approximately 2 minutes onto the surface of a polyvinyl alcohol (PVA) solution contained in a Waring blender, allowing the gypsum to wet out and fall to the bottom of the blender. The PVA solution comprised 305 ml of a stock solution prepared by dissolving 22.1 grams of Elvanol® 90-50 polyvinyl alcohol (available from E.I. du Pont de Nemours and Company) in 1000 ml of water, heating to dissolve the polyvinyl alcohol and cooling the resulting solution at room temperature for at least 24 hours. Immediately after the addition of the pre-blended powder to the PVA solution was complete, foam that had been prepared by blending 65 ml of a 0.5 weight percent solids solution of an alkyl sulfate/alkyl ether sulfate mixture (Cedepal FA-406, manufactured by Stepan Chemicals) in a separate Waring blender for approximately 2 minutes was poured on top of the water/solids mixture and the blender turned on for 10 seconds. The resulting gypsum slurry was used immediately for preparing the gypsum boards as described in the wet adhesion test description set forth above.

Example 1

This example demonstrates preparation of a gypsum board having a spunlaced nonwoven liner.

A gypsum board having dimensions of approximately 3.75 inches (9.53 cm) wide by 16 inches (40.6 cm) long was prepared as described above, using a Sontara® E88-320 spunlaced polyester liner having a basis weight of 4 oz/yd$^2$ (available from E.I. du Pont de Nemours and Company). The liner had a minimum pore size of 15.92 microns, maximum pore size of 82.75 microns, and a mean flow pore size of 33.73 microns.

Samples were prepared for wet adhesion measurements and tested as described above. An average wet adhesion of 10.6±6.6 pounds-force (47.2±29 Newtons) was obtained.

Example 2

This example demonstrates preparation of a gypsum board having a spunbond-meltblown-meltblown-spunbond (SMMS) liner.

A gypsum board having dimensions of approximately 3.75 inches (9.53 cm) wide by 16 inches (40.6 cm) long was prepared as described above using a SMMS polypropylene liner (available from BBA Nonwovens). The liner was thermally point bonded, had a basis weight of 1.8 oz/yd$^2$, and a minimum pore size of 8.16 microns, maximum pore size of 24.88 microns, and a mean flow pore size of 12.65 microns.

Samples were prepared for wet adhesion measurements and tested as described above. An average wet adhesion of 10.1±2.5 pounds-force (45±11 Newtons) was obtained.

Example 3

This example demonstrates preparation of a gypsum board having a spunbonded polypropylene liner that had been thermally point bonded.

A gypsum board having dimensions of approximately 3.75 inches (9.53 cm) wide by 16 inches (40.6 cm) long was prepared using a melt-spun spunbonded polypropylene liner having a basis weight of 2.0 oz/yd$^2$, comprising fibers having an effective diameter of approximately 9.4 microns, and containing 4 weight percent titanium dioxide. The spunbonded liner was thermally point bonded between an engraved oil-heated metal calender roll and a smooth oil heated metal calender roll. The engraved roll had a surface with a diamond pattern having a point size of 0.396 mm$^2$, a point depth of 0.7 mm, a point spacing of 1.72 mm, and a bond area of 14.6%. The emboss-bonded points on the more deeply embossed side of the fabric had a depth of approximately 0.36 mm with the dimensions of the diamond shaped embossed pattern of 0.95 mm from point to point by 0.84 mm point to point for the overall footprint of each embossing point. The side of the fabric opposite the deeply embossed side was relatively smooth with gradual depressions 0.10 mm deep. The point bonded sheet had a minimum pore size of 8.68 microns, maximum pore size of 47.63 microns, and a mean flow pore size of 19.55 microns.

Samples were prepared for wet adhesion measurements and tested as described above. A set of boards were prepared with the deeply embossed side of the liner adjacent the gypsum core and another set was prepared with the relatively smooth side of the liner adjacent the gypsum core to demonstrate the effect of surface texture on wet adhesion. An average wet adhesion of 11.8±2.8 pounds-force (52±12 Newtons) was obtained for the boards having the deeply embossed side of the liner adjacent the gypsum core. An average wet adhesion of 7.0±1.2 pounds-force (31.1±5.3 N) was achieved for the boards having the relatively smooth side of the liner adjacent the gypsum core, a reduction by about 40% compared to the more deeply embossed side.

Example 4

This example demonstrates preparation of a gypsum board having a spunbonded polyester liner.

A gypsum board having dimensions of approximately 3.75 inches (9.53 cm) wide by 16 inches (40.6 cm) long was prepared using a melt-spun spunbonded polyester liner having a basis weight of 1.9 oz/yd$^2$, and comprising fibers having an effective diameter of approximately 8.6 microns. The spunbonded liner was thermally point bonded between an engraved oil-heated metal calender roll and a smooth oil heated metal calender roll. The engraved roll had a chrome coated non-hardened steel surface with a diamond pattern having a point size of 0.466 mm$^2$, a point depth of 0.86 mm, a point spacing of 1.2 mm, and a bond area of 14.6%. The point bonded sheet had a minimum pore size of 14.69 microns, maximum pore size of 70.63 microns, and a mean flow pore size of 29.01 microns. The gypsum board was prepared with the more deeply embossed sides of the liner facing the gypsum slurry.

Samples were prepared for wet adhesion measurements and tested as described above. An average wet adhesion of 12.3±2.2 pounds-force (55±10 Newtons) was obtained.

Example 5

This example demonstrates preparation of a gypsum board having a flash spun nonwoven liner using a simulated roller coating process to provide a dense gypsum layer adjacent the nonwoven liner.

A gypsum board having dimensions of approximately 3.75 inches (9.53 cm) wide by 16 inches (40.6 cm) long was prepared using a Tyvek® 1058D flash spun high density polyethylene liner (available from E.I. du Pont de Nemours and Company). The procedure described above was used to prepare the board except that a dense gypsum layer was coated onto the surface of the first section liner after it was placed in the mold. The dense gypsum slurry was prepared by pre-blending 200 grams of Hydrostone plaster (available from USG Corporation) and 1.1 grams of accelerator by shaking the mixture in a plastic bag. This pre-blended mixture was added to 68 ml of water in a jar which was then covered and the contents mixed by shaking for 15 seconds.

A small portion (about 20 ml) of the resulting dense gypsum slurry was immediately poured onto the liner and thinly spread using a smooth plastic blade held at an angle of about 45 degrees to the sheet. A gypsum slurry identical to those used in the previous examples was then poured into the mold on top of the dense gypsum layer and a second flash spun liner was placed on top of the slurry.

Samples were prepared for wet adhesion measurements and tested as described above. An average wet adhesion of 11.8±0.9 pounds-force (52.5±4 Newtons) was obtained, significantly higher than the wet adhesion obtained when the dense gypsum layer is omitted (Comparative Example A). The obtained wet adhesion should be sufficient for commercial gypsum manufacturing.

Comparative Example A

This example demonstrates preparation of a gypsum board having a flash spun polyethylene nonwoven liner using conventional methods.

A gypsum board having dimensions of approximately 3.75 inches (9.53 cm) wide by 16 inches (40.6 cm) long was prepared as described in Example 5 except that the dense gypsum layer was omitted.

Samples were prepared for wet adhesion measurements and tested as described above. An average wet adhesion of 7.1±1.3 pounds-force (31.6±5.8 Newtons) was obtained. The wet adhesion was judged to be insufficient for the board to be processed in a conventional gypsum board manufacturing process.

Example 6

This example demonstrates preparation of a gypsum board having a point bonded flash-spun nonwoven liner.

A gypsum board having dimensions of approximately 3.75 inches (9.53 cm) wide by 16 inches (40.6 cm) long was prepared using Tyvek® 1443R flash-spun high density polyethylene nonwoven liner (available from E.I. du Pont de Nemours and Company). Tyvek® 1443R is a "soft structure" flash spun nonwoven, which has been point bonded and softened, as described in U.S. Pat. No. 3,427,376. The liner was thermally point bonded with an engraved roll having a point spacing of 1.66 mm in the machine direction and 0.914 mm in the cross direction, a point size of 0.242 mm² (0.381 mm×0.635 mm), a point depth of 0.9 mm, and a bond area of 29.3%.

Samples were prepared for wet adhesion measurements and tested as described above. An average wet adhesion of 7.6±0.7 pounds force was obtained. The wet adhesion obtained should be sufficient for commercial gypsum board manufacturing.

It will be apparent to those skilled in the art that modifications and variations can be made in process and gypsum board material of this invention. The invention in its broader aspects is, therefore, not limited to the specific details or the illustrative examples described above. Thus, it is intended that all matter contained in the foregoing description, drawings and examples shall be interpreted as illustrative and not in a limiting sense.

What is claimed is:

1. A gypsum board, comprising:
   a first polymeric fibrous sheet having a maximum pore size between fibers of about 83 micrometers, said first sheet having a first surface;
   a second fibrous sheet, said second fibrous sheet having a first surface; and
   a wet and stiff gypsum core sandwiched between said first and second sheets;
   wherein said first surface of said first sheet and said first surface of said second sheet have pores containing set gypsum of said gypsum core intertwined with the fibers in the first and second sheets, said first and second sheets adhering to said wet gypsum core with an adhesive strength of at least 7.5 lb.

2. The gypsum board of claim 1 wherein said first and second sheets adhere to said wet gypsum core with an adhesive strength of at least 10 lb.

3. The gypsum board of claim 2 wherein said first and seconds sheets are nonwoven sheets.

4. The gypsum board of claim 3 wherein said first surface of said first sheet and said first surface of said second sheet are embossed surfaces.

5. The gypsum board of claim 1 wherein said first surface of said first sheet and said first surface of said second sheet are comprised of webs selected from the group of needle punched staple fiber sheets, hydroentangled fibrous sheets, and spunbond sheets.

6. The gypsum board of claim 1, wherein said first surface of said first nonwoven sheet and said first surface of said second nonwoven sheet are coated with a primer layer of a high density gypsum slurry having a density that is at least 1.1 times the density of the gypsum core.

7. A process for manufacturing a gypsum-based substrate, comprising the steps of:
   adding calcined gypsum and water to a mixer;
   mixing the gypsum and water in the mixer to produce a gypsum slurry that is comprised of 50 to 65 weight percent gypsum, and is comprised of 35 to 50 weight percent of water, based on the total weight of the of the gypsum slurry, said gypsum slurry having a density in the range of 0.95 to 1.5 g/cm³;
   providing a first polymeric fibrous shoot having a maximum pore size between fibers of about 83 micrometers, said first sheet having a first surface;
   pouring said gypsum slurry from said mixer onto the first surface of said first sheet and spreading the gypsum slurry over said first surface of said first sheet;
   providing a second fibrous sheet, said second fibrous sheet having a first surface;
   placing said first surface of said second sheet over the gypsum slurry that has been spread over the first surface of said first sheet;
   enclosing the gypsum slurry between said first and second sheets to bring the slurry into intimate contact with said first and second sheets and form an elongated strip of gypsum slurry sandwiched between said first and second sheets;
   allowing said elongated strip of gypsum slurry to set up and harden to form a stiff elongated strip having a solid, wet gypsum core sandwiched between said first and second sheets, said first and second sheets adhering to said wet gypsum core with an adhesive strength of at least 7.5 lb.;
   cutting said stiff elongated strip into gypsum board of desired length; and drying said gypsum board in a dryer to remove excess water from the gypsum boards.

8. The process of claim 7 wherein said second sheet is a synthetic polymeric fibrous sheet.

9. The process of claim 8 wherein said first surface of said first sheet and said first surface of said second sheet have open pores between fibers of sufficient size for the gypsum slurry to enter the pores and become intertwined with the fibers in the sheets when the gypsum slurry is compressed between first and second sheets.

10. The process of claim 9 wherein said first and second sheets each have a mean flow pore size, measured according to ASTM F316-86, of at least 8 microns.

11. The process of claim 10 wherein said first and second sheet each have a mean flow pore size, measured according to ASTM F316-86, in the range of 8.7 to 40 mircons.

12. The process of claim 8 wherein said first and second sheets are nonwoven sheets.

13. The process of claim 12 wherein said first surface of said first sheet and said first surface of said second sheet are made of sheets selected from the group of needle punched staple fiber sheets, hydroentangled fibrous sheets, and spunbond sheets.

14. The process of claim 8 wherein said first surface of said first sheet and said first surface of said second sheet are embossed surfaces.

15. The process of claim 8 wherein said first surface of said first sheet and said first surface of said second sheet are precoated with a layer of high density gypsum slurry having a density that is at least 1.1 times the density of the gypsum slurry.

16. The process of claim 7 wherein during the step of enclosing the gypsum slurry between said first and second sheets, said first and second sheets move at a linear speed of at least 50 ft/min.

17. The process of claim 7 wherein during the step of allowing said elongated strip of gypsum slurry to set up and harden to form a stiff elongated strip having a solid, wet gypsum core sandwiched between said first and second sheets, said first and second sheets adhere to said wet gypsum core with an adhesive strength of at least 10 lb.

18. The process of claim 7 wherein said second fibrous sheet is a paper sheet.

* * * * *

UNITED STATES PATENT AND TRADEMARK OFFICE
CERTIFICATE OF CORRECTION

PATENT NO.    : 6,485,821 B1
DATED         : November 26, 2002
INVENTOR(S)   : Robert B. Bruce and David M. Harriss It is certified that error appears in the above-identified patent and that said Letters Patent is hereby corrected as shown below:

Column 12,
Line 37, text reads "providing a first polymer fibrous shoot" should read -- providing a first polymer fibrous sheet --.

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,485,821 B1  
DATED        : November 26, 2002  
INVENTOR(S)  : Bruce, Robert B. and Harriss, David M.

It is certified that error appears in the above-identified patent and that said Letters Patent is hereby corrected as shown below:

<u>Title page,</u>
Item [73], Assignee, add co-assignee -- Innogyps Inc., Burlington Ontario Canada (CA). --

Signed and Sealed this

Twenty-sixth Day of August, 2003

JAMES E. ROGAN
*Director of the United States Patent and Trademark Office*